United States Patent [19]

Motohashi

[11] Patent Number: 5,727,861
[45] Date of Patent: Mar. 17, 1998

[54] FLASH EMITTING APPARATUS

[75] Inventor: Katsumi Motohashi, Hoya, Japan

[73] Assignee: Olympus Optical Co., Ltd., Tokyo, Japan

[21] Appl. No.: 548,885

[22] Filed: Oct. 26, 1995

[30] Foreign Application Priority Data

Nov. 1, 1994 [JP] Japan ................... 6-269167

[51] Int. Cl.$^6$ ................................. G03B 15/05
[52] U.S. Cl. ............... 362/16; 362/217; 362/220; 362/306; 362/223
[58] Field of Search ............... 362/16, 220, 223, 362/288, 310, 306, 217, 382; 396/197, 192

[56] References Cited

U.S. PATENT DOCUMENTS

| | | | |
|---|---|---|---|
| 4,156,890 | 5/1979 | Hebert et al. | 362/16 |
| 4,161,019 | 7/1979 | Mulvey | 362/220 |
| 4,317,625 | 3/1982 | Van Allen | 362/16 |
| 4,412,276 | 10/1983 | Blinow | 362/16 |
| 4,460,942 | 7/1984 | Pizzuti et al. | 362/16 |
| 4,498,126 | 2/1985 | Hernandez | 362/372 |
| 5,047,900 | 9/1991 | DiRisio | 362/16 |
| 5,541,826 | 7/1996 | Sandell et al. | 362/220 |

FOREIGN PATENT DOCUMENTS 27661  7/1981  Japan.

*Primary Examiner*—Thomas M. Sember
*Attorney, Agent, or Firm*—Louis Weinstein

[57] ABSTRACT

A flash emitting apparatus has a straight-tube type flash discharge tube and a reflector for accommodating the flash discharge tube which condenses and reflects an emission of the flash discharge tube to direct light forward, the apparatus including: a pair of electrodes disposed on opposing end portions of said flash discharge tube; discharge tube supports for supporting the flash discharge tube on said reflector; a frame member having said flash discharge tube and said reflector disposed therein; and restriction members formed internally of said frame member for restricting movement of said flash discharge tube in a longitudinal direction coaxial with a line connecting the pair of electrodes so as to retain the flash discharge tube within a certain range with respect to the reflector.

21 Claims, 4 Drawing Sheets

FLASH EMITTING APPARATUS

BACKGROUND OF THE INVENTION

1. Field of the Invention

The present invention relates to flash emitting apparatus, and more particularly relates to the supporting structure for a straight-tube type flash discharge tube which is located therein.

2. Related Art Statement

Various types have been known as the flashing section of a strobe and various methods have also been known as means for supporting a discharge tube within such emitting section. An example of such structure is shown in FIG. 6. As shown in FIG. 6, a strobe flashing section includes a discharge tube 101 for emitting a strobe light and a reflector 102 having a curved surface for reflecting emitted light from the discharge tube 101 forward, the discharge tube 101 being attached into holes on the reflector 102 through rubber bushes 103, 103' at a predetermined position of the reflector 102, i.e., within an optically suitable range (First Art).

Further, as shown in FIG. 8, technical means is also known in which the discharge tube 101 is inserted into holes on a reflector 102' and the discharge tube 101 is supported on the reflector by means of a strap-like elastic member (rubber band) 120 which is extended over the two sides of the discharge tube 101.

Furthermore, in Japanese Utility Model Publication No. 56-27661, as shown in FIG. 7, a discharge tube is constituted by a glass tube 116, metal caps 111 and 111' each having a concave cross section provided at the two end portions thereof and electrodes 112 and 112' provided on the portion of the metal caps facing the interior of the glass tube and is inserted into holes on the reflector 113; the metal caps 111 and 111' are covered by insulating covers 114 and 114' and the insulating covers 114 and 114' are secured on the reflector 113. Leads 115 and 115' are then brought out through groove portions which are provided on the insulating covers (Second Art).

In the case of the Second Art, the discharge tube in assembly process is always attached at a predetermined position with respect to the reflector 113 and the position of the discharge tube will not be shifted even when it has received an inadvertent impact.

In the case of the above First Art, however, the discharge tube 101 is attached to the reflector 102 only by the fastening force due to an elasticity of the rubber bushes 103, 103'. In assembly, there is thus a possibility of the discharge tube 101 being attached to the reflector 102 at an unsuitable position different from the predetermined position.

Further, even if the discharge tube 101 in its assembly process is attached to the reflector 102 at its predetermined position, the position of the discharge tube 101 may be axially shifted when receiving an inadvertent impact.

Furthermore, in the case of the above Second Art, there are problems such that the insulating covers 114, 114' for fixing the discharge tube onto the reflector 113 are additionally required and securing of the insulating covers 114, 114' to the reflector 113 results in a complicated structure at the portions for securing the two members to each other.

OBJECTS AND SUMMARY OF THE INVENTION

It is a first object of the present invention to provide a flash emitting apparatus having a simple structure in which a discharge tube in assembly process is always accurately placed at a predetermined position with respect to a reflector.

It is a second object of the present invention to provide a flash emitting apparatus in which a discharge tube in assembly process is attached to a reflector at a predetermined position, i.e., within an optically suitable range so that a defect during the attaching stage of the discharge tube is prevented and at the same time in which the position of the discharge tube is not shifted even when an inadvertent impact has been received.

It is a third object of the present invention to provide a flash emitting apparatus in which an insulation distance required between the external surface of the upper and lower frames of the reflector and the electrodes of the discharge tube may be reduced as compared with the case where a shift in position of the discharge tube is to be considered.

In accordance with the present invention, there is provided a flash emitting apparatus having a straight-tube type flash discharge tube and a reflector accommodating the flash discharge tube and condensing and reflecting an emission of the flash discharge tube to throw light forward, the apparatus comprising:

- electrodes disposed on opposite end portions of said flash discharge tube;
- discharge tube supporting means for supporting said flash discharge tube on said reflector;
- a frame member having said flash discharge tube and said reflector disposed therein; and
- restriction means formed internally of said frame member for restricting movement of said flash discharge tube in a longitudinal direction thereof connecting the two electrodes so as to place said flash discharge tube within a certain range with respect to said reflector.

These as well as other objects and advantages of the present invention will become further apparent from the following detailed explanation.

DETAILED DESCRIPTION OF THE PREFERRED EMBODIMENTS

An embodiment of the present invention will now be described with reference to the drawings.

Figure 1:
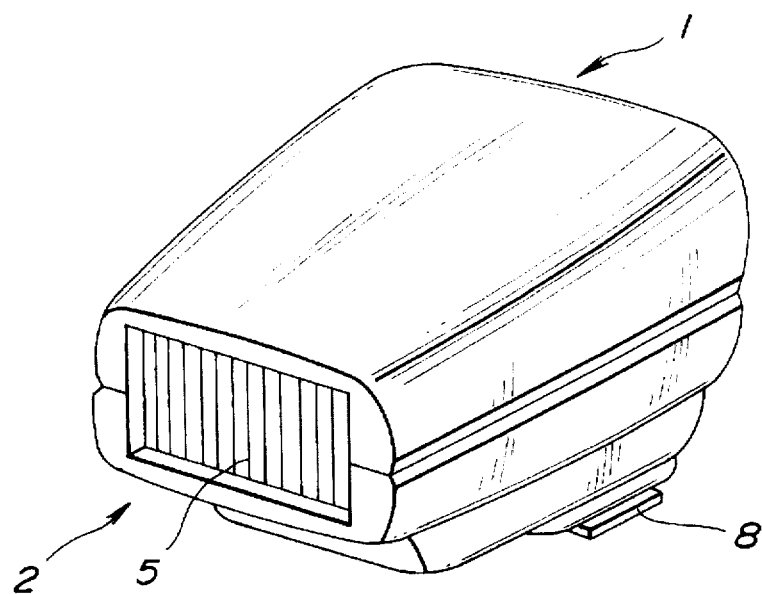
FIG. 1 is a perspective view showing the external appearance of a flash emitting apparatus according to a first embodiment of the present invention.
Figure 2:
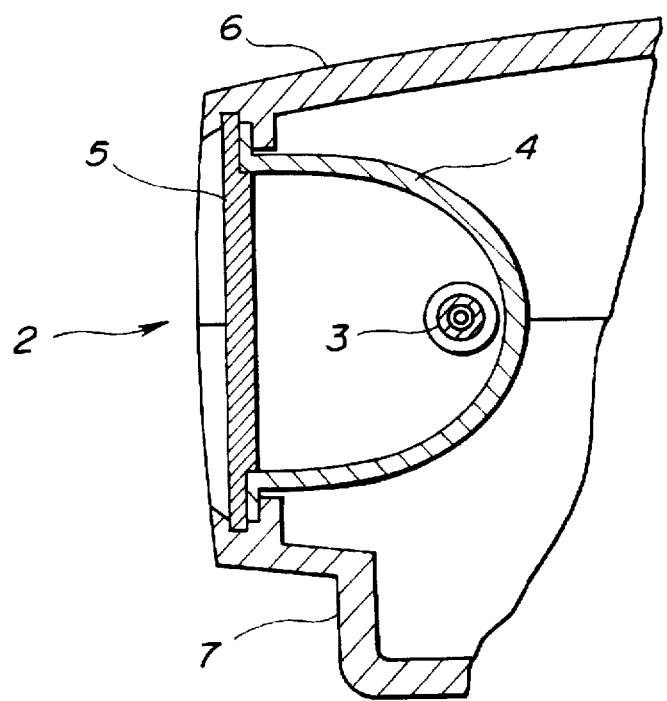
FIG. 2 is a sectional view of certain portions of the flash emitting apparatus of the first embodiment looking in the direction of one end of the flash discharge tube.
Figure 3:
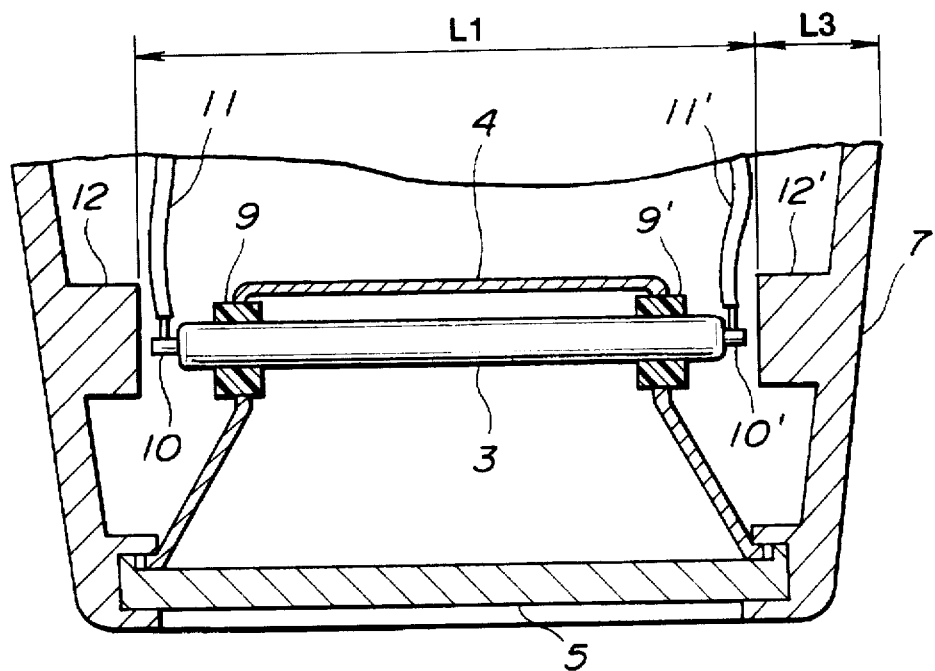
FIG. 3 is a sectional view of certain portions of the flash emitting apparatus of the first embodiment looking in a direction perpendicular to the longitudinal axis of the flash tube.
Figure 4:
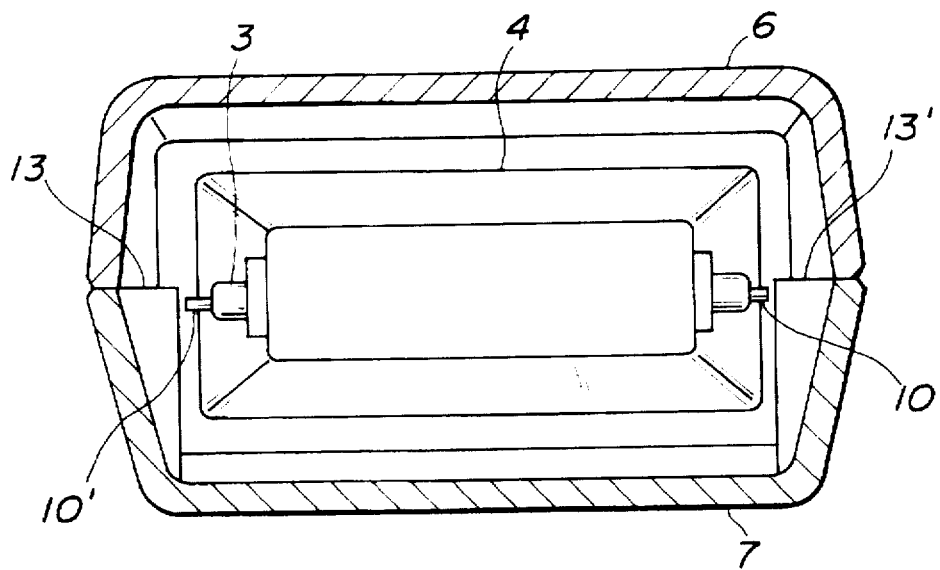
FIG. 4 is a sectional view of certain portions viewing the emitting portion from the rear of the flash emitting apparatus of the first embodiment.

FIGS. 1 to 4 illustrate a flash emitting apparatus which is a first embodiment of the present invention. FIG. 1 illustrates a perspective view showing external appearance of the flash emitting apparatus of the first embodiment and FIG. 2 is a longitudinal sectional view of certain portions of the flash emitting apparatus. Further, FIG. 3 is a sectional view of certain portions in a direction of width of the flash emitting apparatus and FIG. 4 is a sectional view of certain portions viewing the emitting section from the rear of the flash emitting apparatus.

As shown in FIG. 1, the flash emitting apparatus of the present embodiment has a light emitting section 2 disposed on a front portion of a strobe body 1, and the strobe body 1 has on its lower end portion an attaching leg section 8 which is designed to be mounted on a hot shoe of a camera body. Further, as shown in FIG. 2, the light emitting section 2 is constituted by a discharge tube 3 and reflector 4 for emitting a strobe light and a reflector 4 having a curved surface for reflecting forward light emitted from the discharge tube 3 being both contained in a box which is formed by upper and lower frames 6 and 7 and an emitting window 5 formed by a rectangular diffuser which allows transmission of direct light from the discharge tube 3 and reflected light from the reflector 4 as a diffused As shown in FIG. 3, the discharge tube 3 is a straight-tube type flash discharge tube and electrodes 10, 10' are provided on opposite ends of the discharge tube 3, respectively. Further, the electrodes 10, 10' are respectively secured by means of soldering to one end of leads 11, 11' which are extended from a power supply circuit (not shown).

The reflector 4 is substantially in the form of a gutter having an opening on the front side of the strobe body 1. Its longitudinal section in a middle of the upper and lower surfaces thereof is substantially parabolic as shown in FIG. 2, the parabolic shape extending from said front opening toward its base portion. Side wall surfaces of the reflector 4 are opened toward the front opening from the base side in the manner of a taper as shown in FIG. 3, and the holes are provided on a center portion toward the base side of the two side wall surfaces at positions corresponding to the two end portions of said discharge tube 3.

Hollow bushes 9, 9' made of an elastic material such as a rubber are fitted into the holes, respectively, so that the two end portions of the discharge tube 3 are supported at a predetermined position such that the electrodes 10, 10' are caused to project outwardly from the reflecting surface of the reflector 4 through the bushes 9, 9'.

Projections 12, 12' respectively facing the electrodes 10, 10' are formed on the internal wall surface of the lower frame 7 for forming the box of the above described strobe body 1 at portions adjacently opposing the electrodes 10, 10' of the discharge tube 3. A space of a length L1 between the projections 12 and 12' is constructed as an equivalent of the range in which the discharge tube 3 exists when the discharge tube 3 is attached to the reflector 4 at a predetermined position, i.e., within an optically suitable range.

In the construction as described, even when, for example, an inadvertent impact is applied to the strobe body 1 so as to produce a force which tends to shift the position of the discharge tube 3, the electrode 10 or 10' of the discharge tube 3 abuts against the projection 12 or 12' whereby no more shifting of the discharge tube 3 occurs.

As described above, since the length L1 of the space between the projections 12 and 12' is constructed to be an equivalent of the range in which the discharge tube 3 exists when the discharge tube 3 is attached to the reflector 4 at a predetermined position, i.e., within an optically suitable range, this assures that the discharge tube 3 is always attached at a predetermined position with respect to the reflector 4 even if the position of the discharge tube 3 is somewhat shifted.

In the assembly process, the discharge tube 3 is placed through the reflector 4 by means of rubber bushes 9, 9' and the reflector 4 is then attached to the lower frame 7. At this time, if the discharge tube 3 is not attached at a predetermined position to the reflector 4, the electrode 10 or 10' of the discharge tube 3 abuts against an upper surface portion 13 or 13' of the projection 12 or 12' whereby attaching of the reflector 4 to the lower frame 7 becomes impossible (see FIG. 4).

Accordingly, in the assembly process, the discharge tube 3 is always attached at a predetermined position, i.e., within an optically suitable range to the reflector 4 so that an occurrence of defective attaching of the discharge tube in assembly may be prevented.

Further, for safety, it is necessary to secure a sufficient insulating distance between the electrodes 10, 10' of the discharge tube 3 and the external surface of the upper frame 6 and lower frame 7 through an overlapping portion of the upper frame 6 and lower frame 7. According to this embodiment, however, the position of the discharge tube 3 is restricted by the projections 12, 12' whereby an insulating distance from the outer surface of the box to the electrode 10' of the discharge tube 3 as shown in FIG. 3 is equal to or greater than distance L3 which is necessary therefor. The insulating distance to be required may thus be less than that in the case where an occurrence of shift in position of the discharge tube 3 is possible, i.e., in the case where an insulating distance is secured with allowing an amount of shift in position of the discharge tube.

Figure 6:
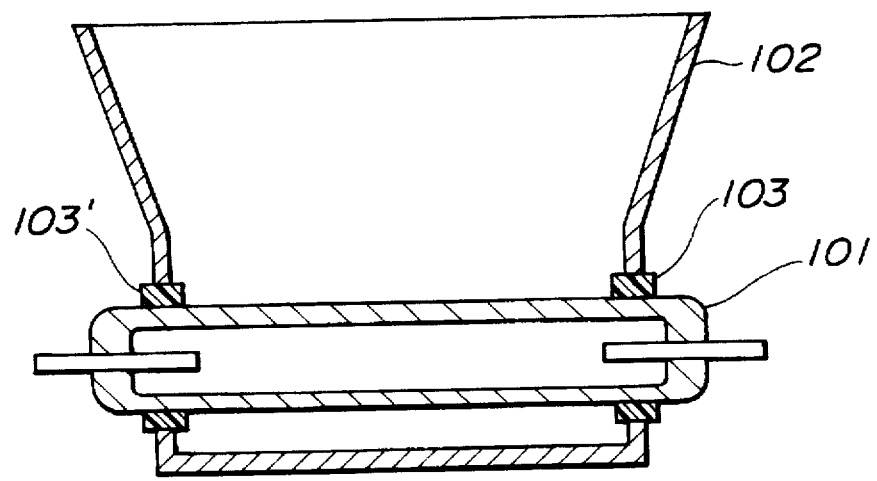
FIG. 6 is a sectional view of certain portions showing an example of a conventional strobe emitting section.
Figure 7:
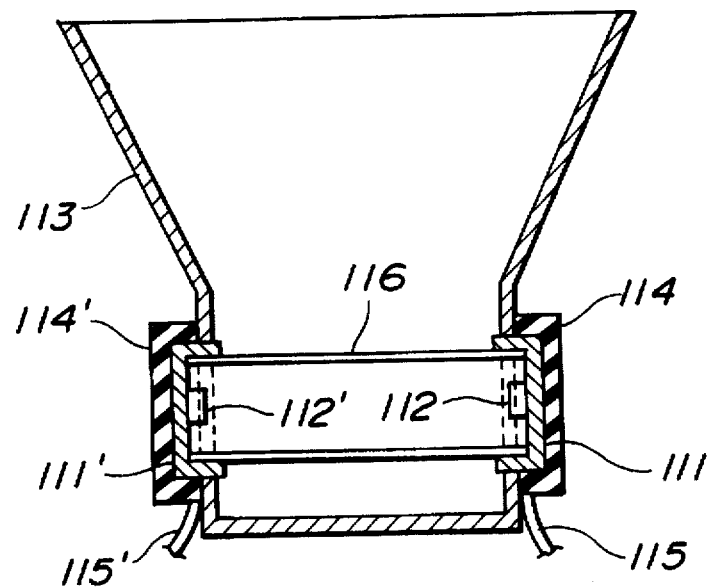
FIG. 7 is a sectional view of certain portions showing another example of a conventional strobe emitting section.
Figure 8:
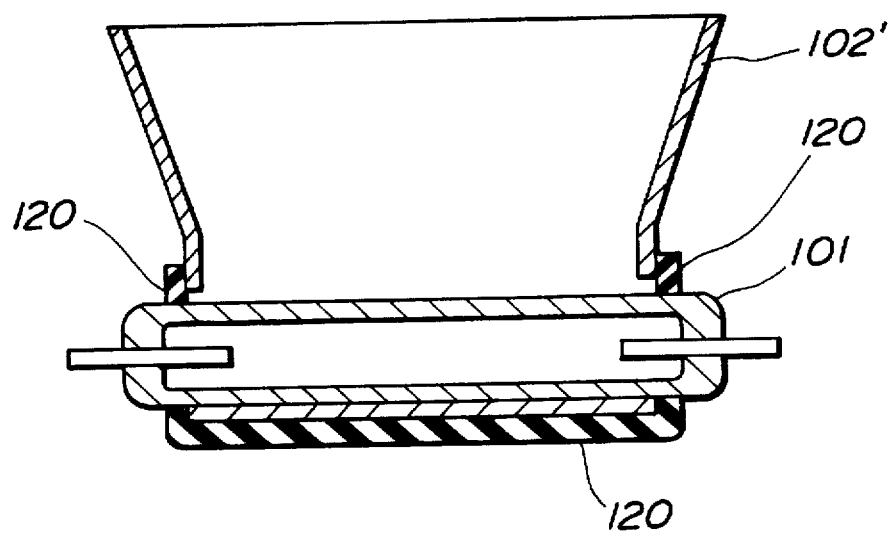
FIG. 8 is a sectional view of certain portions showing still another example of a conventional strobe emitting section.

It should be noted that, in the first embodiment as described above, the discharge tube 3 is supported by the rubber bushes 9, 9' (see FIG. 3). Although this is the conventionally used means as shown in FIG. 6, the advantages of the present embodiment may also be achieved by using a rubber band 120 as shown in FIG. 8 as the means for supporting the discharge tube 3.

A second embodiment of the present invention will now be described.

Figure 5:
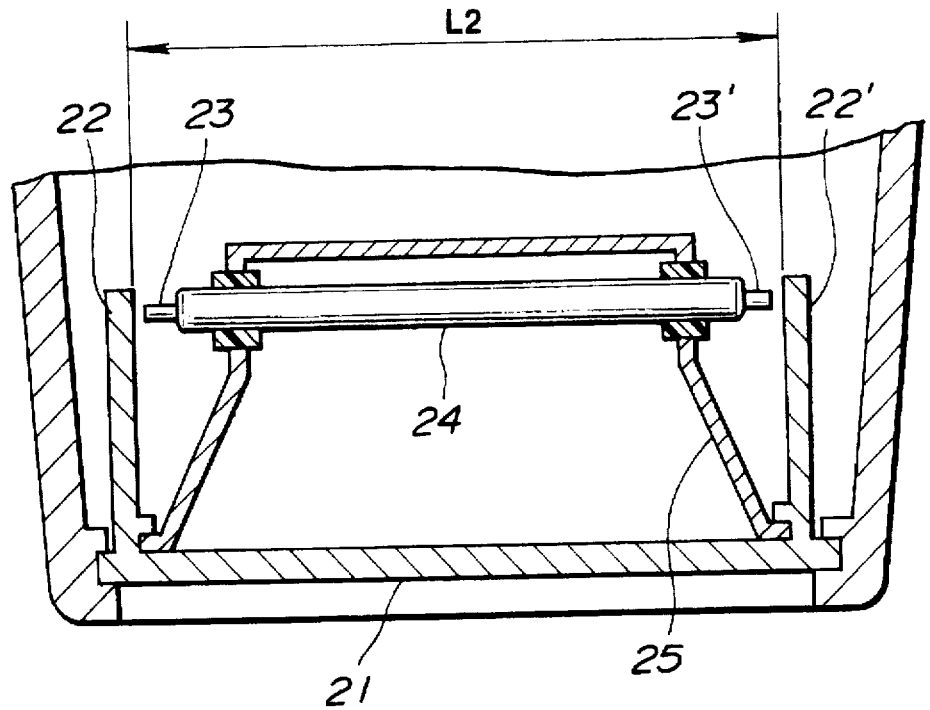
FIG. 5 is a sectional view of certain portions of a flash emitting apparatus of a second embodiment of the present invention looking in a direction perpendicular to the longitudinal axis of the flash discharge tube.

FIG. 5 is a sectional view of certain portions in a direction of width showing the flash emitting apparatus of the second embodiment.

In the second embodiment, projections 22, 22' are formed in a manner extended rearward at the two ends of a light emitting window 21 which is disposed at the front opening of a reflector 25 of a similar construction as the above described first embodiment. The front end portions of projections 22, 22' are extended to be situated close to electrodes 23, 23' of a discharge tube 24 of a similar construction as the above described first embodiment so that the length of the space L2 between the projections 22, 22' is an equivalent of the range in which the discharge tube 24 exists when the discharge tube 24 is attached to the reflector 25 at a predetermined position, i.e., within an optically suitable range.

Construction of the other portions is similar to that of the above described first embodiment and will not be described in detail.

As has been described in detail, according to the above embodiments, the space for containing the discharge tube formed by those component parts neighboring the electrodes of the discharge tube is equivalent to the range in which the discharge tube exists when the discharge tube is attached to the reflector at a predetermined position, i.e., within an optically suitable range. Thereby, the discharge tube when assembled into the flash emitting apparatus is always accurately positioned at a predetermined position with respect to a reflector, i.e. within an optically suitable range to prevent a defective attaching of the discharge tube and the position of the discharge tube is not shifted even when an inadvertent impact has been received.

Also, there is an advantage that the required insulating distance between the external surface of the upper and lower frames and the electrodes of the discharge tube may be reduced as compared with the case where a shift in position of the discharge tube is to be considered.

As has been described above, according to the present invention, it is possible to provide a flash emitting apparatus having a simple structure in which the discharge tube when assembled is always accurately positioned at a predetermined position with respect to the reflector.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A flash emitting apparatus having a straight tube type flash discharge tube and a reflector accommodating the flash discharge tube and condensing and reflecting an emission of the flash discharge tube to direct light in a forward direction, the apparatus comprising:

electrodes disposed on opposing end portions of said flash discharge tube;

discharge tube supporting means for supporting said flash discharge tube on said reflector in such a manner as to allow movement thereof only in a direction of an axial length coaxial with a line connecting the two electrodes thereof;

a frame member having said flash discharge tube and said reflector disposed therein; and restriction means extending inwardly from said frame member and positioned adjacent to and spaced from a free end of at least one of said electrodes for restricting movement of said flash discharge tube in a longitudinal direction coaxial with the two electrodes so as to prevent said flash discharge tube from moving beyond a certain range with respect to said reflector as determined by said restriction means.

2. A flash emitting apparatus according to claim 1 wherein said restriction means has a portion for engaging a free end of said one electrode to maintain said free end of said electrode a sufficient insulating distance from an exterior surface of said frame member.

3. A flash emitting apparatus having a flash discharge tube having electrodes at opposing ends thereof and a reflector accommodating the flash discharge tube and condensing and reflecting an emission of the flash discharge tube to direct light forward, the apparatus comprising:

discharge tube supporting means for supporting vicinities of said electrodes of said flash discharge tube respectively at two side wall surfaces of said reflector in such a manner as to allow movement of said flash discharge tube only in a direction of an axial length coaxial with a line connecting the two electrodes thereof;

a frame member for forming an accommodating space for said flash discharge tube and said reflector; and at least one restriction means projecting inwardly from said frame member and positioned adjacent to and spaced from an end of at least one of said flash tube electrodes for restricting a width of the accommodating space of said frame member with respect to a length of an accommodating position of said flash discharge tube to be substantially equal to a length of a space containing said two electrode portions of said flash discharge tube, so as to prevent lengthwise movement of said flash discharge tube beyond a predetermined alignment range with respect to said reflector.

4. A flash emitting apparatus according to claim 1 or 3 wherein said frame member is formed by an armor member.

5. A flash emitting apparatus according to claim 1 or 3 wherein said discharge tube supporting means supports said flash discharge tube at a hole provided on said reflector through an elastic member.

6. A flash emitting apparatus according to claim 5 wherein said elastic member is arranged between said flash tube and said hole.

7. A flash emitting apparatus according to claim 1 or claim 3 wherein said restriction means for restricting a position of said flash discharge tube with respect to said reflector is formed as an integral part of the frame member to which said reflector is internally secured.

8. A flash emitting apparatus according to claim 1 or claim 3 wherein said flash emitting apparatus has light emitting window panel provided in a vicinity of said front opening portion of said reflector and wherein said restriction means for restricting the lengthwise position of said flash discharge tube with respect to said reflector is formed as an integral part of the light emitting window panel.

9. A flash emitting apparatus according to claim 1 or claim 3 wherein said discharge tube supporting means attaches said flash discharge tube to said reflector through an elastic member with portions of the electrodes projecting from side wall surfaces of said reflector.

10. A flash emitting apparatus having a straight tube type flash discharge tube and a reflector accommodating the flash discharge tube and condensing and reflecting an emission of the flash discharge tube to direct light in a forward direction, the apparatus comprising:

electrodes disposed on opposing end portions of said flash discharge tube;

discharge tube supporting means for supporting said flash discharge tube on said reflector;

a frame member having said flash discharge tube and said reflector disposed therein;

restriction means projecting inwardly from said frame member for restricting movement of said flash discharge tube in a longitudinal direction coaxial with the two electrodes so as to prevent said flash discharge tube from moving beyond a certain range with respect to said reflector as determined by said restriction means; and said discharge tube supporting means comprising a strap-like elastic member extended over two sides of said flash discharge tube inserted into holes respectively formed in opposing side wall surfaces of said reflector.

11. A flash emitting apparatus having a straight tube type flash discharge tube and a reflector accommodating the flash discharge tube and condensing and reflecting an emission of the flash discharge tube to direct light in a forward direction, the apparatus comprising:

electrodes disposed on opposing end portions of said flash discharge tube;

discharge tube supporting means for supporting said flash discharge tube on said reflector;

a frame member having said flash discharge tube and said reflector disposed therein;

restriction means formed internally of said frame member for restricting movement of said flash discharge tube in a longitudinal direction coaxial with the two electrodes so as to prevent said flash discharge tube from moving beyond a certain range with respect to said reflector as determined by said restriction means; and said frame member including a hollow, box-shaped housing formed of two members for accommodating said flash discharge tube and said reflector and wherein said restriction means comprises projections formed on at least one of said two members so as to face one another for abutting against the two electrode portions of said flash discharge tube.

12. A flash emitting apparatus having a straight tube type flash discharge tube and a reflector accommodating the flash discharge tube and condensing and reflecting an emission of the flash discharge tube to direct light in a forward direction, the apparatus comprising:

electrodes disposed on opposing end portions of said flash discharge tube;

discharge tube supporting means for supporting said flash discharge tube on said reflector;

a frame member having said flash discharge tube and said reflector disposed therein;

restriction means formed internally of said frame member for restricting movement of said flash discharge tube in a longitudinal direction coaxial with the two electrodes so as to prevent said flash discharge tube from moving beyond a certain range with respect to said reflector as determined by said restriction means; and said restriction means being a projection integral with said frame member and disposed in a manner facing portions of the electrodes in an axial direction of said flash discharge tube.

13. A flash emitting apparatus having a flash discharge tube having electrode portions at opposite ends thereof and a reflector accommodating the flash discharge tube and condensing and reflecting an emission of the flash discharge tube to direct light forward, the apparatus comprising:

discharge tube supporting means for supporting said flash discharge tube in a vicinity of said electrodes respectively at opposing side wall surfaces of said reflector in such a manner that said electrodes are projected outwards from opposing ends of said reflector and also in such a manner as to allow movement of said flash discharge tube only in a direction of an axial length coaxial with a line connecting the two electrodes;

an armor frame member for forming an accommodating space for said flash discharge tube and said reflector; and restriction means projecting inwardly from said armor frame member and positioned adjacent to and spaced from an end of at least one of said flash tube electrodes for restricting lengthwise movement of said flash discharge tube so as to retain said flash discharge tube within a predetermined insulating distance from an outer surface of said armor frame member.

14. A flash emitting apparatus having a flash discharge tube having electrode portions in a vicinity of opposing ends thereof and a reflector accommodating the flash discharge tube and condensing and reflecting an emission of the flash discharge tube to direct light forward, the apparatus comprising:

discharge tube supporting means for supporting the electrode portions of said flash discharge tube at opposing side wall surfaces of said reflector in such a manner that said electrode portions are projected outwards from said reflector and also in such a manner as to allow movement of said flash discharge tube only in a direction of an axial length coaxial with a line connecting the two electrodes thereof;

a holding member for holding said reflector; and restriction means projecting from said holding member and positioned adjacent to and spaced from an end of at least one of said flash tube electrodes for restricting lengthwise movement of said flash discharge tube so as to place said flash discharge tube supported as movable lengthwise by said discharge tube supporting means within a predetermined suitable range with respect to said reflector.

15. A flash emitting apparatus comprising:

a cylindrical flash discharge tube;

a reflector for reflecting a flash from said discharge tube, said reflector supporting said cylindrical flash discharge tube in such a manner as to allow movement of said flash discharge tube only in a direction of an axial length coaxial with a line connecting the two electrodes thereof; and a frame member having projections having portions thereof positioned adjacent to and spaced from opposed ends of said flash tube electrodes for restricting said reflector to a suitable position within said frame member and restricting the position of said discharge tube so as to place it at a suitable position with respect to said reflector.

16. A flash emitting apparatus comprising:

a cylindrical flash discharge tube;

a reflector for reflecting a flash from said discharge tube, said reflector supporting said cylindrical flash discharge tube in such a manner as to allow movement of said flash discharge tube only in a direction of an axial length coaxial with a line connecting the two electrodes thereof; and a frame member restricting a relative position of said reflector and said discharge tube to each other to a suitable position within the frame member and retaining an arrangement of said discharge tube and said reflector within the frame member, a part of said frame member having projections with portions thereof positioned adjacent to and spaced from opposed ends of said flash tube electrodes and restricting lengthwise movement of said discharge tube with respect to said reflector.

17. A flash emitting apparatus comprising:

a cylindrical flash discharge tube;

a reflector for reflecting a flash from said discharge tube; and a frame member for restricting a relative position of said reflector and said discharge tube to each other to a suitable position within the frame member, a position of said reflector being maintained within the frame member and a position of said discharge tube being maintained within the frame member to retain a given arrangement of said discharge tube and said reflector within the frame member, a part of said frame member projecting from said frame member toward said flash tube electrodes and being positioned adjacent to and spaced from opposed ends of the flash tube electrodes in such a manner as to be capable of coming into contact therewith and restricting a lengthwise relative movement of said discharge tube with respect to said reflector.

18. A flash emitting apparatus having a flash discharge tube having electrode portions at opposing ends thereof and a reflector accommodating the flash discharge tube and condensing and reflecting an emission of the flash discharge tube to direct light forward, the apparatus comprising:

a frame member forming an accommodating space for said flash discharge tube and said reflector;

discharge tube supporting means formed within said frame member for supporting said flash discharge tube in such a manner as to allow movement of said flash discharge tube only in a direction of an axial length coaxial with a line connecting the two electrodes thereof;

reflector supporting means formed within said frame member for supporting said reflector;

restriction means projecting from said frame member and being positioned adjacent to and spaced from opposed ends of said flash tube electrodes for restricting movement of said flash discharge tube in a direction of an axial length coaxial with a line connecting the two electrodes so as to place a lengthwise accommodating position of said flash discharge tube within a predetermined range with respect to said reflector.

19. A flash emitting apparatus having a flash discharge tube having electrodes at opposing ends thereof and a reflector accommodating the flash discharge tube and condensing and reflecting an emission of the flash discharge tube to direct light forward, the apparatus comprising:

discharge tube supporting means for supporting vicinities of said electrodes of said flash discharge tube respectively at two side wall surfaces of said reflector;

a frame member for forming an accommodating space for said flash discharge tube and said reflector;

restriction means projecting away from said frame member for restricting a width of the accommodating space of said frame member with respect to a length of an accommodating position of said flash discharge tube to be substantially equal to a length of a space containing said two electrode portions of said flash discharge tube, so as to prevent lengthwise movement of said flash discharge tube beyond a predetermined alignment range with respect to said reflector;

said discharge tube supporting means comprising a strap-like elastic member extended over two sides of said flash discharge tube inserted into holes respectively formed in opposing side wall surfaces of said reflector.

20. A flash emitting apparatus having a flash discharge tube having electrodes at opposing ends thereof and a reflector accommodating the flash discharge tube and condensing and reflecting an emission of the flash discharge tube to direct light forward, the apparatus comprising:

discharge tube supporting means for supporting vicinities of said electrodes of said flash discharge tube respectively at two side wall surfaces of said reflector;

a frame member for forming an accommodating space for said flash discharge tube and said reflector;

restriction means formed internally of said frame member for restricting a width of the accommodating space of said frame member with respect to a length of an accommodating position of said flash discharge tube to be substantially equal to a length of a space containing said two electrode portions of said flash discharge tube, so as to prevent lengthwise movement of said flash discharge tube beyond a predetermined alignment range with respect to said reflector; and said frame member including a hollow, box-shaped housing formed of two members for accommodating said flash discharge tube and said reflector and wherein said restriction means comprises projections formed on at least one of said two members so as to face one another for abutting against the two electrode portions of said flash discharge tube.

21. A flash emitting apparatus having a flash discharge tube having electrodes at opposing ends thereof and a reflector accommodating the flash discharge tube and condensing and reflecting an emission of the flash discharge tube to direct light forward, the apparatus comprising:

discharge tube supporting means for supporting vicinities of said electrodes of said flash discharge tube respectively at two side wall surfaces of said reflector;

a frame member for forming an accommodating space for said flash discharge tube and said reflector;

restriction means formed internally of said frame member for restricting a width of the accommodating space of said frame member with respect to a length of an accommodating position of said flash discharge tube to be substantially equal to a length of a space containing said two electrode portions of said flash discharge tube, so as to prevent lengthwise movement of said flash discharge tube beyond a predetermined alignment range with respect to said reflector; and said restriction means being a projection integral with said frame member and disposed in a manner facing portions of the electrodes in an axial direction of said flash discharge tube.

* * * * *